United States Patent
Panza-Giosa et al.

(10) Patent No.: US 11,192,186 B2
(45) Date of Patent: Dec. 7, 2021

(54) SYSTEMS AND METHODS FOR HIGH STRENGTH TITANIUM WIRE ADDITIVE MANUFACTURING

(71) Applicant: GOODRICH CORPORATION, Charlotte, NC (US)

(72) Inventors: Roque Panza-Giosa, Oakville (CA); Noel C. Haynes, Etobicoke (CA)

(73) Assignee: Goodrich Corporation, Charlotte, NC (US)

( * ) Notice: Subject to any disclaimer, the term of this patent is extended or adjusted under 35 U.S.C. 154(b) by 378 days.

(21) Appl. No.: 16/102,430

(22) Filed: Aug. 13, 2018

(65) Prior Publication Data

US 2020/0047248 A1 Feb. 13, 2020

(51) Int. Cl.

| | |
|---|---|
| *B33Y 10/00* | (2015.01) |
| *B33Y 70/00* | (2020.01) |
| *B21C 1/02* | (2006.01) |
| *B22F 1/00* | (2006.01) |
| *C22C 1/04* | (2006.01) |
| *B22F 10/10* | (2021.01) |
| *B33Y 30/00* | (2015.01) |
| *C22F 1/18* | (2006.01) |

(52) U.S. Cl.
CPC ............. *B22F 10/10* (2021.01); *B21C 1/02* (2013.01); *B22F 1/0003* (2013.01); *B33Y 10/00* (2014.12); *B33Y 30/00* (2014.12); *B33Y 70/00* (2014.12); *C22C 1/0458* (2013.01); *C22F 1/183* (2013.01); *B22F 2301/205* (2013.01)

(58) Field of Classification Search
CPC .. B22F 3/008; B22F 1/0003; B22F 2301/205; B22F 2999/00; B22F 3/16; B22F 2998/10; B22F 5/12; B22F 3/24; B22F 3/17; B22F 3/20; B22F 3/18; B22F 10/10; B33Y 10/00; B33Y 30/00; B33Y 70/00; B33Y 80/00; B21C 1/02; B21C 37/045; B21C 23/08; C22C 1/0458; C22C 14/00; C22F 1/183; B23K 35/325; B23K 35/40; B23K 35/0261; Y02P 10/25
See application file for complete search history.

(56) References Cited

U.S. PATENT DOCUMENTS

| | | |
|---|---|---|
| 5,897,830 A | 4/1999 | Abkowitz et al. |
| 9,796,137 B2 | 10/2017 | Zhang et al. |

(Continued)

OTHER PUBLICATIONS

Sintering and Heat Treatment of Titanium Alloys by Pulsed Electric Current Sintering By F. Zhang, Y. Quan, M. Reich, O. Kessler and E. Burkel (Year: 2013).*

(Continued)

*Primary Examiner* — Rebecca Janssen
(74) *Attorney, Agent, or Firm* — Snell & Wilmer L.L.P.

(57) ABSTRACT

A method of titanium wire additive manufacturing is disclosed. The method may comprise mixing a plurality of powdered metals comprising titanium, iron, vanadium, and aluminum to produce a powder blend, sintering the powder blend to form a billet, performing a wire forming operation to produce a worked wire, heat treating the worked wire to produce a heat treaded wire, loading the heat treated wire into a wirefeed additive manufacturing machine, and producing a metallic component from the heat treated wire. The titanium may be a titanium hydride powder.

17 Claims, 3 Drawing Sheets

(56) References Cited

U.S. PATENT DOCUMENTS

| | | | |
|---|---|---|---|
| 2014/0000332 A1* | 1/2014 | Wilson | B21C 23/005 |
| | | | 72/253.1 |
| 2014/0263246 A1 | 9/2014 | Brice | |
| 2015/0093287 A1* | 4/2015 | Pederson | F01D 25/005 |
| | | | 420/417 |
| 2015/0298798 A1* | 10/2015 | Holloway | B64C 25/14 |
| | | | 244/102 R |
| 2016/0151865 A1* | 6/2016 | Jensrud | C22C 14/00 |
| | | | 75/245 |
| 2017/0304896 A1* | 10/2017 | Kovalchuk | B22F 3/1055 |
| 2017/0306449 A1* | 10/2017 | Lin | B33Y 40/00 |
| 2018/0029131 A1 | 2/2018 | Pecina et al. | |

OTHER PUBLICATIONS

AZO materials, grade Ti-8V-5Fe-1Al Alloy, Aug. 6, 2013 (Year: 2013).*

Hamid Azizi et al: "Additive manufacturing of a novel Ti-Al-V-Fe alloy using selective laser melting", Additive Manufacturing, vol. 21, May 1, 2018 (May 1, 2018), pp. 529-535.

Curt Lavender et al: "2011 DOE Hydrogen and Fuel Cells and Vehicle Technologies Programs Annual Merit Review Low Cost Titanium—Propulsion Applications", Mar. 11, 2011 (Mar. 11, 2011), XP055648462, Retrieved from the Internet: URL:https://www.energy.gov/sites/prod/files/2014/03/f11 / pm006_lavender_2011_o.pdf.

Georg I. Abakumov et al: "Georg Abakumov, Director Business Development, ADMA Products, Inc. Powder Metallurgy Titanium and Titanium Alloy Components Manufactured from Hydrogenated Titanium Powders", Oct. 10, 2019 (Oct. 10, 2019), Retrieved from the Internet: URL:https://cdn.ymaws.com/titanium.org/resource/resmgr/2010_2014_papers/AbakumovGeorg_2012.pdf [retrieved on Dec. 3, 2019].

European Patent Office, European Search Report dated Dec. 10, 2019 in Application No. 19191301.1.

* cited by examiner

SYSTEMS AND METHODS FOR HIGH STRENGTH TITANIUM WIRE ADDITIVE MANUFACTURING

FIELD

The disclosure generally relates to the manufacture of sintered aerospace components using wires suitable for additive manufacturing and more particularly to the wires being produced by forming a sintered billet of titanium and other metallic powders.

BACKGROUND

Aircraft landing gear designs incorporate large structural components made from high strength titanium alloys. Powder based additive manufacturing techniques, such as powder bed, for titanium alloy landing gear components are unsuited for producing large parts. Wire deposition additive manufacturing techniques may be used to form large parts. However, existing wire feedstocks for titanium alloys are high cost and tend to have reduced tensile and/or fatigue strength in comparison to wrought processed material.

SUMMARY

In various embodiments, a method of titanium wire additive manufacturing may comprise mixing a plurality of powdered metals comprising titanium, iron, vanadium, and aluminum to produce a powder blend, sintering the powder blend to form a billet, performing a wire forming operation to produce a worked wire, heat treating the worked wire to produce a heat treated wire, loading the heat treated wire into a wirefeed additive manufacturing machine, and producing a metallic component from the heat treated wire. The titanium may be a titanium hydride powder.

In various embodiments, powder blend comprises between 4% and 6% by weight iron, between 0.5% to 2% by weight aluminum, and between 6% to 9% by weight vanadium. In various embodiments, the sintering is performed between 900° F. and 1600° F. and under a vacuum. The wire forming operation may include at least one of rotary swaging, rolling, or extrusion. The wire forming operation may include at least one of a metal pickling treatment, an intermediate heat treatment, or applying anti-oxidation coating. In various embodiments, any of the rotary swaging, rolling, extrusion, metal pickling treatment, or intermediate heat treatment may be performed in a vacuum or under an inert gas. In various embodiments, the heat treatment or the intermediate heat treatment includes at least one of annealing, solutionizing, or aging. In various embodiments, the heat treated wire comprises between 0.1% and 1.0% by weight oxygen and between 0.001% and 0.015% by weight hydrogen. In various embodiments, the heat treated wire may undergo at least one of a beta phase transformation, a beta anneal, or a alpha-beta anneal during the heat treatment or the intermediate heat treatment. In various embodiments, the diameter of the heat treated wire is between 0.0104 in and 0.156 in.

In various embodiments, an article of manufacture including a metallic component additively manufactured from a wire feedstock by a wirefeed additive manufacturing machine may include the wire feedstock comprising a heat treated wire drawn from a sintered billet of powdered metals, the powdered metals comprising titanium hydride, iron, vanadium, and aluminum. The powdered metals may comprise between 4% and 6% by weight iron, between 0.5% to 2% by weight aluminum, and between 6% to 9% by weight vanadium. The heat treated wire may comprise between 0.1% and 1.0% by weight oxygen and between 0.001% and 0.015% by weight hydrogen. In various embodiments, the heat treated wire is heat treated by at least one of annealing, solutionizing, or aging. In various embodiments, the heat treated wire may undergo at least one of a beta phase transformation, a beta anneal, or an alpha-beta anneal during the at least one of annealing, solutionizing, or aging.

In various embodiments, a method of forming a wire for titanium wire additive manufacturing comprises mixing a plurality of powdered metals comprising titanium, iron, vanadium, and aluminum to produce a powder blend, sintering the powder blend to form a billet, performing a wire forming operation on the billet to produce a worked wire, and heat treating the worked wire to produce a heat treated wire. In various embodiments, the titanium is a titanium hydride powder. In various embodiments, the powder blend comprises between 4% and 6% by weight iron, between 0.5% to 2% by weight aluminum, and between 6% to 9% by weight vanadium. In various embodiments, the sintering is performed between 900° F. and 1600° F. and under a vacuum.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The Titanium alloy Titanium-1aluminum-8valadium-5iron (Ti-185) has a relatively high tensile strength; however, the high iron percentage of the alloy causes segregation during conventional melting. Powder metallurgy techniques such as, for example, pressing and sintering may overcome the segregation issues induced in conventional melt metallurgy thereby enabling a lower cost part. Alloying powder may be either elemental powders (e.g., Ti, Fe, V, Al), master alloy powders, or a combination thereof. Sintered billets may be drawn or otherwise worked into a wire feedstock for additive manufacturing operations. In this regard, large high strength titanium alloy components such as, for example, pistons, bogie beams, torque links, brake rods, and/or the like may be produced at reduced cost. Additionally, additive manufacturing according to the process described herein may tend to overcome macro segregation issues encountered in conventional melt metallurgy and benefit of enhanced fatigue and ultimate strength.

Figure 1:
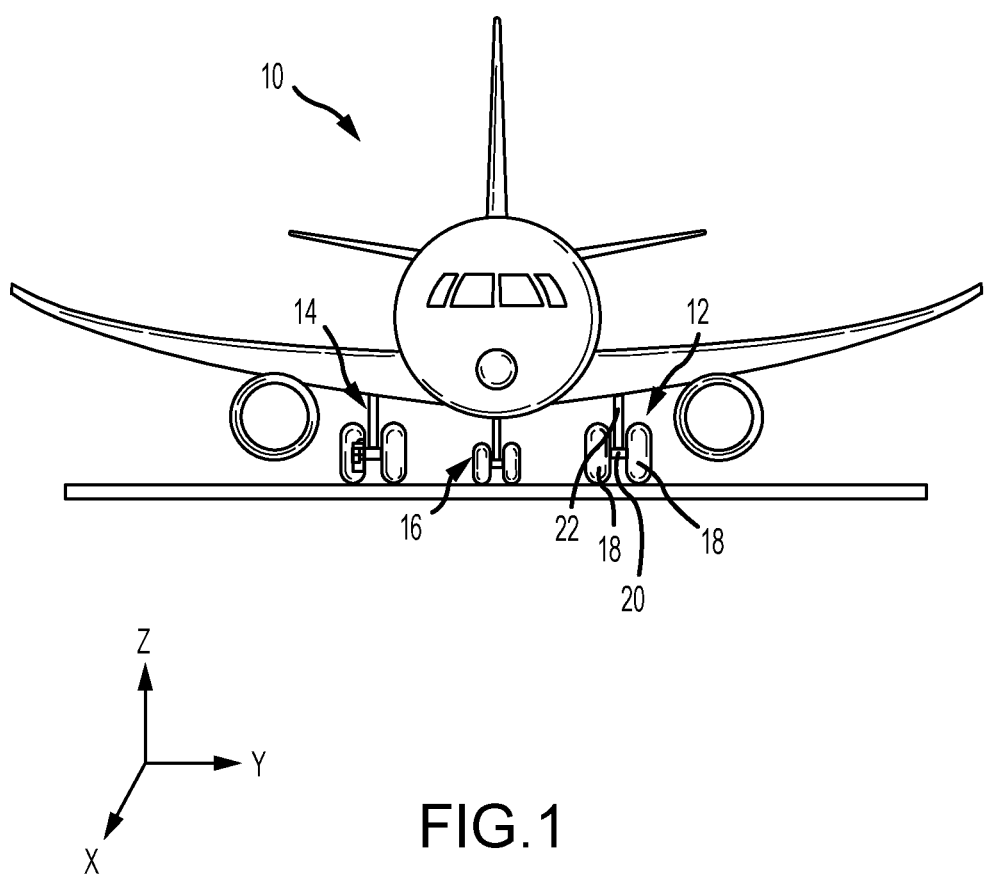
FIG. 1 illustrates an exemplary aircraft, in accordance with various embodiments.

With reference to FIG. 1, an aircraft 10 in accordance with various embodiments may comprise aircraft systems and components. For example, aircraft 10 may comprise one or more landing gear such as landing gear 12, landing gear 14 and landing gear 16. Landing gear 12, landing gear 14 and landing gear 16 may generally support aircraft 10 when aircraft 10 is not flying, allowing aircraft 10 to taxi, take off, and land without damage and may comprise wheels and an oleo strut, also referred to as a shock strut, comprising a strut cylinder and a strut piston filled with a hydraulic fluid. For example, landing gear 12 may include wheels 18 coupled by an axle 20 and a shock strut 22. In operation, aircraft landing gear may experience significant forces such as landing loads and aerodynamic loads and may tend to benefit from high performance alloy construction. In various embodiments, aircraft 10 components such as landing gear 12 and shock strut 22 may comprise complex geometries tending to benefit from additive manufacturing techniques.

Figure 2A:
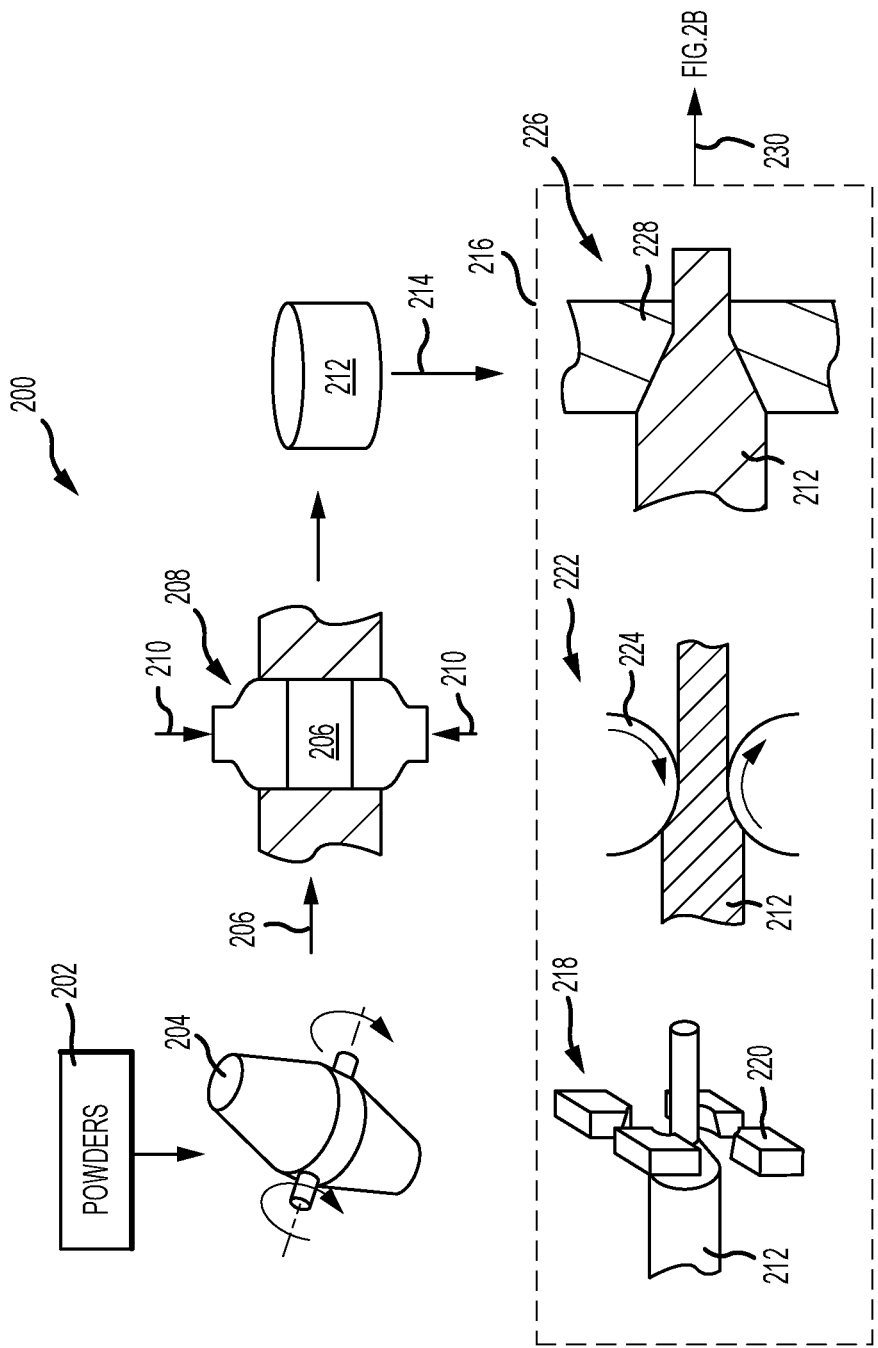
FIG. 2A illustrates a method for titanium wire additive manufacturing, in accordance with various embodiments.
Figure 2B:
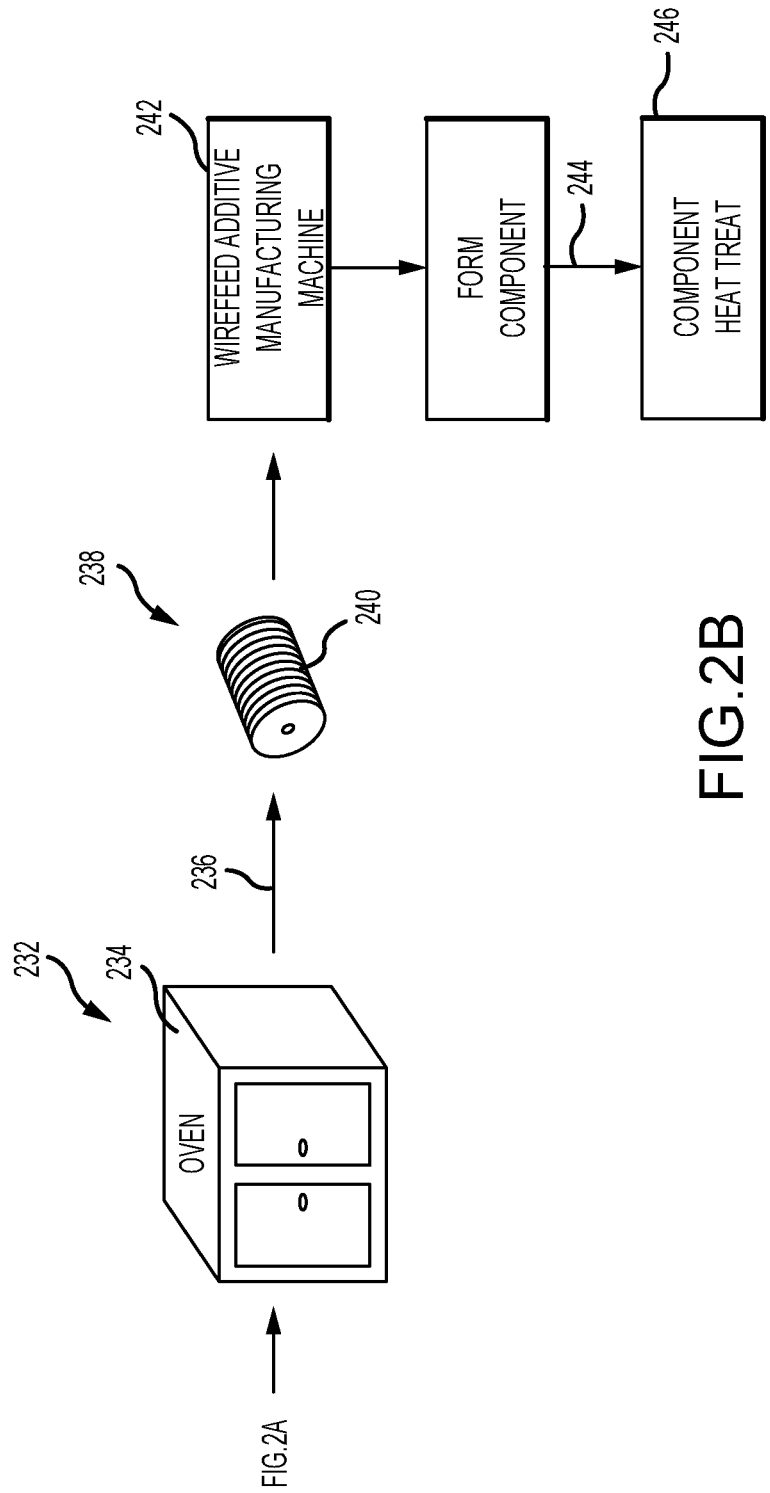
FIG. 2B illustrates a continuation of a method from FIG. 2A for titanium wire additive manufacturing, in accordance with various embodiments.

With additional reference to FIG. 2A, a method for titanium wire additive manufacturing is illustrated according to various embodiments. A plurality of powdered metals 202 comprising titanium and iron are added to powder blender 204 and blended to consistency to powder blend 206. In various embodiments, powder blend 206 may comprise titanium and iron and any of oxygen, aluminum, vanadium, and/or hydrogen. Powdered metals 202 may include titanium hydride powder. Powder blend 206 may be between 4% and 6% by weight iron, between 0.5% to 2% by weight aluminum, and between 6% to 9% by weight vanadium. The input powders may contain oxygen and hydrogen levels between 0.01 and 1.0% by weight. In various embodiments, powdered metals consist of Al—V master alloy and Fe elemental powder blended with $TiH_2$ powder. The billet elemental weight percent may be adjusted to account for vaporization of elements such as aluminum during the wire-fed additive process tending thereby to ensure the additive manufactured part is within a desired weight percent limit. In various embodiments, the billet shape may be a solid round or other shape as appropriate to input stock for wire drawing.

Powder blend 206 is loaded into sintering furnace 208 which applies force 210 to compact the powder blend 206 and heat to sinter the powder blend 206, thereby forming billet 212. In various embodiments, sintering furnace 208 may be a vacuum sintering furnace and powder blend 206 may be compressed and heated under a vacuum. In various embodiments, the compressed powder blend 206 may be heated to between 900° F. [483° C.] and 1600° F. [871° C.] for the sintering operation. In this regard, the sintered billet may undergo beta phase transformation. Sintering the powder blend 206 may include removing gasses evolved from the powder blend 206 during sintering and sintering furnace 208 may include a gas removal system and/or control system. In various embodiments, oxygen, nitrogen, and/or hydrogen may be removed from the powder blend 206 during sintering. In various embodiments, billet 212 may undergo an annealing cycle subsequent to sintering and prior to wire forming operations 216. In various embodiments, the annealing cycle temperatures may be between 1200° F. [649° C.] and 1400° F. [760° C.].

Billet 212 may receive an initial anti-oxidation coating 214 prior to undergoing wire forming operations 216. In various embodiments, wire forming operations 216 may draw the billet 212 that has been sintered into a wire of a desired diameter. Wire forming operations 216 may include rotary swaging 218 via an array of swaging dies 220 which exert force circumferentially about billet 212, thereby reducing its diameter. Wire forming operations 216 may also include rolling 222 of billet 212 through rollers 224, thereby reducing its diameter. Additionally, wire forming operations 216 may include extruding 226 of billet 212 through die 228, thereby reducing its diameter. A plurality of wire forming operations 216 may be conducted repeatedly or sequentially as required to achieve a desired wire diameter for a worked wire 230. In various embodiments, the diameter of billet 212 may be reduced by wire forming operations 216 to a wire diameter between 0.0104 in [0.265 mm] and 0.156 in [4.0 mm]. In various embodiments, anti-oxidation coating 214 may be reapplied between successive wire forming operations 216 as rotary swaging 218, rolling 222, and extruding 226 tend to remove the coating. In various embodiments, the worked billet 212 may undergo a metal pickling treatment between wire forming operations 216. In this regard, scale formation on billet 212, impurity, and oxygen uptake of billet 212 are reduced. In various embodiments, any of wire forming operations 216 may be conducted in a vacuum or under an inert gas such as, for example, argon.

In various embodiments, worked wire 230 may undergo one or more heat treatment operations 232, for example, in a heat treat oven 234 between wire forming operations 216 (e.g., intermediate heat treatments) and, in this regard, crack formation and oxide formation during wire forming operations 216 may be reduced, and/or when worked wire 230 has achieved the desired final diameter (e.g., final heat treatment). Heat treatment operations may include solutionizing heat treatment, aging, and/or annealing. In various embodiments, heat treatments may include a beta anneal and an alpha beta anneal. For example, annealing between 1550° F. [843° C.] and 1600° F. [871° C.] or annealing between 1200° F. [649° C.] and 1400° F. [760° C.]. In various embodiments, a solutionizing heat treatment may be between 1350° F. [732° C.] and 1450° F. [788° C.]. In various embodiments, an aging heat treatment may be between 800° F. [427° C.] and 1100° F. [593° C.] or may be adjusted to achieve a desired material property for wire manufacture. In various embodiments, the heat treated wire may have between 0.001% and 0.015% by weight hydrogen and may have between 0.1% and 1.0% by weight oxygen.

Heat treated alloy wire 236 may be coiled 238 onto feed spools 240 and loaded in a wirefeed additive manufacturing machine 242 configured for heat treated alloy wire 236. Wirefeed additive manufacturing machine 242 may comprise hardware and/or software configured to perform additive manuring of an aerospace component. In various embodiments wirefeed additive manufacturing may include laser wire metal deposition, electron beam additive manufacturing, wire arc additive manufacturing and/or the like. In various embodiments, wirefeed additive manufacturing machine 242 may be configured to deposit the heat treated wire on a substrate. For example, the wirefeed additive manufacturing machine 242 may be configured with a turntable, gantry style or rotating head and tailstock style. In various embodiments, the wirefeed additive manufacturing machine 242 may incorporate a single or a multiple wirefeed system and be capable of delivering the heat treated alloy wire 236 at a rate of of 0.5 in/min [1.27 cm/min] to 25 in/min [63.5 cm/min] and may have deposition rates between 1 and 20 lbs/hour [0.45 and 9 kg/hr]. Wirefeed additive manufacturing machine 242 may produce a metallic aerospace component 244 from heat treated alloy wire 236. Metallic aerospace component 244 may undergo a component heat treat process 245 similar to heat treatment operations 232.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of titanium wire additive manufacturing, comprising:

mixing a plurality of powdered metals comprising titanium, iron, vanadium, and aluminum to produce a powder blend, wherein the powder blend comprises between 4% and 6% by weight iron, between 0.5% to 2% by weight aluminum, and between 6% to 9% by weight vanadium;

sintering the powder blend to form a billet;

performing a wire forming operation on the billet to produce a worked wire, wherein the wire forming operation includes applying an anti-oxidation coating;

heat treating the worked wire to produce a heat treated wire;

loading the heat treated wire into a wirefeed additive manufacturing machine configured to deposit the heat treated wire; and producing a metallic component from the heat treated wire, the metal component comprising between 4% and 6% by weight iron, between 0.80% to 1.50% by weight aluminum, and between 7.5% to 8.5% by weight vanadium.

2. The method of claim 1, wherein the titanium is a titanium hydride powder.

3. The method of claim 2, wherein the metallic component is at least one of a piston, a bogie beam, or a torque link.

4. The method of claim 3, wherein the sintering is performed between 900° F. and 1600° F. and under a vacuum.

5. The method of claim 3, wherein the wire forming operation further includes at least one of rotary swaging, rolling, or extrusion.

6. The method of claim 5, wherein the wire forming operation further includes at least one of a metal pickling treatment or an intermediate heat treatment.

7. The method of claim 6, wherein at least one of the rotary swaging, rolling, extrusion, metal pickling treatment, or intermediate heat treatment are performed in at least one of a vacuum or under an inert gas.

8. The method of claim 6, wherein at least one of the heat treatment or the intermediate heat treatment includes at least one of annealing, solutionizing, or aging.

9. The method of claim 1, wherein the heat treated wire comprises between 0.1% and 1.0% by weight oxygen and between 0.001% and 0.015% by weight hydrogen.

10. The method of claim 9, wherein the heat treated wire has undergone at least one of a beta phase transformation, a beta anneal, or an alpha beta anneal during at least one of the heat treatment or the intermediate heat treatment.

11. The method of claim 10, wherein the diameter of the heat treated wire is between 0.0104 in and 0.156 in.

12. A method of forming a wire for titanium wire additive manufacturing, comprising:

mixing a plurality of powdered metals comprising titanium, iron, vanadium, and aluminum to produce a powder blend, wherein the powder blend comprises between 4% and 6% by weight iron, between 0.5% to 2% by weight aluminum, and between 6% to 9% by weight vanadium;

sintering the powder blend to form a billet;

annealing the billet after sintering the powder blend;

performing a wire forming operation on the billet after annealing the billet to produce a worked wire, wherein the wire forming operation includes applying an anti-oxidation coating; and heat treating the worked wire to produce a heat treated wire.

13. The method of claim 12, wherein the titanium is a titanium hydride powder.

14. The method of claim 13, wherein the heat treated wire comprises between 4% and 6% by weight iron, between 0.80% to 1.50% by weight aluminum, and between 7.5% to 8.5% by weight vanadium.

15. The method of claim 14, wherein the sintering is performed between 900° F. and 1600° F. and under a vacuum.

16. The method of claim 12, wherein performing the wire forming operation on the billet comprises:

performing a plurality of wire forming operations on the billet to achieve a desired wire diameter; and reapplying the anti-oxidation coating to the billet between successive wire forming operations of the plurality of wire forming operations.

17. The method of claim 12, wherein performing the wire forming operation on the billet comprises:

performing a plurality of wire forming operations on the billet to achieve a desired wire diameter;

subjecting the wire to a first pickling treatment after a first wire forming operation of the plurality of wire forming operations and prior to a second wire forming operation of the plurality of wire forming operations; and subjecting the wire to a second pickling treatment after the second wire forming operation of the plurality of wire forming operations and prior to a third wire forming operation of the plurality of wire forming operations.

* * * * *